United States Patent
Asuri et al.

(10) Patent No.: US 9,112,748 B2
(45) Date of Patent: Aug. 18, 2015

(54) REDUCTION OF SMALL SPURS IN TRANSMITTERS

(71) Applicant: QUALCOMM Incorporated, San Diego, CA (US)

(72) Inventors: Bhushan Shanti Asuri, San Diego, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/765,667

(22) Filed: Feb. 12, 2013

(65) Prior Publication Data

US 2013/0208826 A1    Aug. 15, 2013

Related U.S. Application Data

(60) Provisional application No. 61/598,135, filed on Feb. 13, 2012.

(51) Int. Cl.
*H04L 25/08* (2006.01)
*H04B 1/04* (2006.01)

(52) U.S. Cl.
CPC .............. *H04L 25/08* (2013.01); *H04B 1/0475* (2013.01)

(58) Field of Classification Search
CPC .......... H03B 27/00; H03M 1/66; H04B 1/02; H04B 1/04; H04B 1/38; H04B 3/02; H04B 10/00; H04L 25/03; H04L 25/08; H04L 25/49; H04L 27/00; H04L 27/06; H04L 27/2614; H04W 24/00; H04W 52/367; H04W 4/00; H04W 52/00

USPC ............ 331/18; 341/144, 145; 370/252, 208; 375/219, 295–297, 222, 286, 355, 376; 455/91, 93, 118, 127.5; 342/200; 327/156, 157, 159, 260, 363

See application file for complete search history.

(56) References Cited

U.S. PATENT DOCUMENTS

| | | | |
|---|---|---|---|
| 7,126,519 B1 | 10/2006 | Xu | |
| 7,317,774 B2 * | 1/2008 | Richey et al. | 375/355 |
| 7,636,020 B1 * | 12/2009 | Hwang | 331/16 |
| 8,031,101 B2 * | 10/2011 | Narasimhan et al. | 341/155 |
| 8,055,235 B1 | 11/2011 | Gupta et al. | |
| 8,145,165 B1 * | 3/2012 | Su et al. | 455/232.1 |
| 8,149,896 B2 * | 4/2012 | Filipovic | 375/147 |
| 8,817,925 B2 * | 8/2014 | Husted et al. | 375/346 |

(Continued)

FOREIGN PATENT DOCUMENTS

WO    2007076495 A2    7/2007

OTHER PUBLICATIONS

International Search Report and Written Opinion—PCT/US2013/025970—ISA/EPO—May 29, 2013.

*Primary Examiner* — Syed Haider
*Assistant Examiner* — Shawkat M Ali

(57) ABSTRACT

An apparatus for reducing spurs is described. The apparatus includes a coarse digital to analog converter (DAC). The apparatus also includes a correction term generator. The correction term generator generates a correction term. The correction term has an amplitude within a dynamic range of the coarse digital to analog converter (DAC). The apparatus also includes a baseband filter. The correction term is selected such that the baseband filter reduces the correction term to an amplitude approximating that of a spur in a transmit signal. The correction term is used to reduce a spur.

47 Claims, 9 Drawing Sheets

(56) References Cited

U.S. PATENT DOCUMENTS

| | | | |
|---|---|---|---|
| 2003/0045249 A1* | 3/2003 | Nielsen | 455/118 |
| 2005/0059366 A1* | 3/2005 | Choi et al. | 455/130 |
| 2006/0093019 A1* | 5/2006 | Gaikwad et al. | 375/139 |
| 2008/0089440 A1* | 4/2008 | Curtis | 375/296 |
| 2008/0157881 A1* | 7/2008 | Dent et al. | 331/18 |
| 2008/0158026 A1 | 7/2008 | OBrien | |
| 2009/0232510 A1 | 9/2009 | Gupta et al. | |
| 2011/0007839 A1* | 1/2011 | Tang et al. | 375/296 |
| 2011/0134334 A1 | 6/2011 | Stevenson | |
| 2011/0268164 A1* | 11/2011 | Fillatre et al. | 375/219 |
| 2013/0147529 A1* | 6/2013 | Ganesan et al. | 327/156 |

* cited by examiner

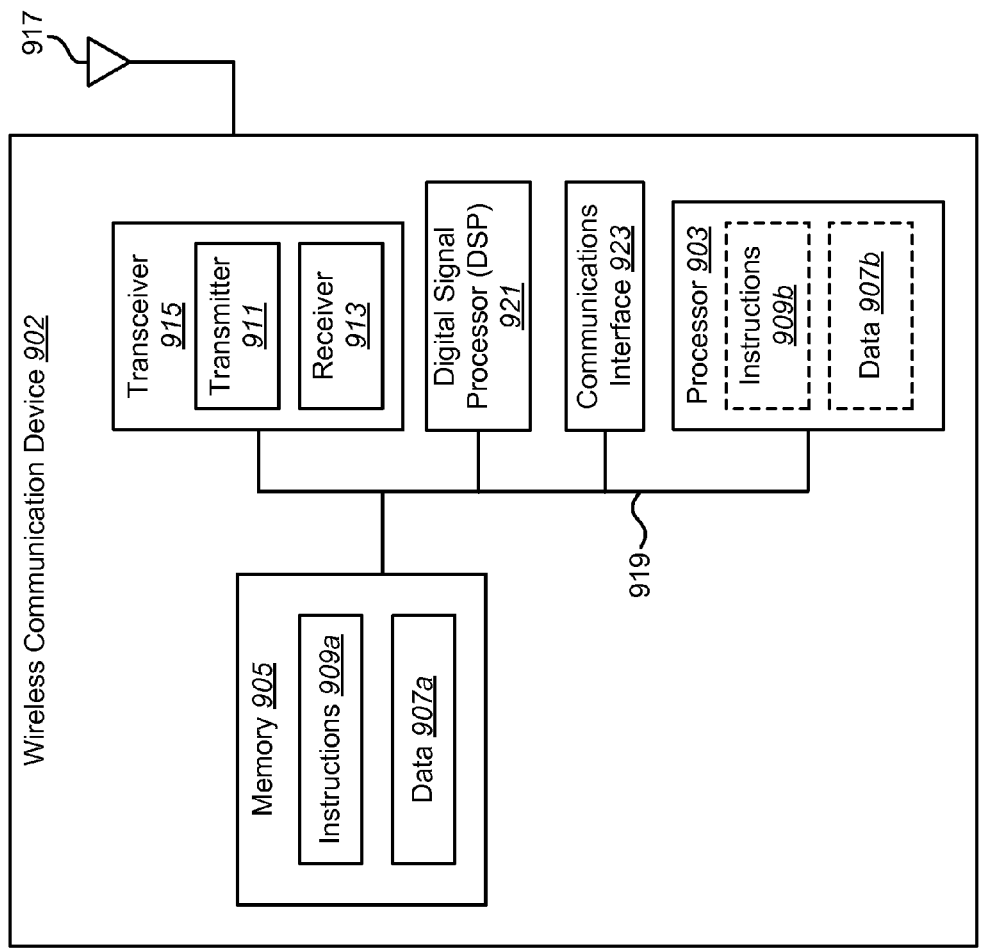

REDUCTION OF SMALL SPURS IN TRANSMITTERS

RELATED APPLICATIONS

This application is related to and claims priority from U.S. Provisional Patent Application Ser. No. 61/598,135 filed Feb. 13, 2012, for "CORRECTION OF SMALL SPURS IN TRANSMITTERS," which is incorporated herein by reference.

TECHNICAL FIELD

The present disclosure relates generally to communication systems. More specifically, the present disclosure relates to systems and methods for correction of small spurs in transmitters.

BACKGROUND

Wireless communication systems are widely deployed to provide various types of communication content such as voice, video, data and so on. These systems may be multiple access systems capable of supporting simultaneous communication of multiple wireless communication devices with one or more base stations.

Digital signal processing provides benefits to wireless communication systems and devices. However, the use of digital signal processing may require a digital to analog converter (DAC) to convert the digital signals to analog signals prior to transmission. Furthermore, the converted analog signal may be processed via a variety of analog circuitry, such as filters, amplifiers, mixers, etc. In processing an analog signal, one or more spurs may be created. Spurs may degrade the receiver band noise and cause a wireless device to fail out-of-band emission specifications.

Various spur reduction techniques exist. In some spur reduction techniques, smaller spurs are not reduced or removed completely, despite having a degrading effect on a signal. Further, removing only the larger spurs may still cause a wireless device to fail out-of-band emission specifications. Benefits may be realized by improvements to wireless devices that reduce small spurs.

SUMMARY

An apparatus for reducing spurs is described. The apparatus includes a coarse digital to analog converter (DAC). The apparatus also include a correction term generator that generates a correction term. The correction term has an amplitude within a dynamic range of the coarse digital to analog converter (DAC). The apparatus also includes a baseband filter. The correction term is selected such that the baseband filter reduces the correction term to an amplitude approximating that of a spur in a transmit signal. The correction term is used to reduce the spur. The spur may have an amplitude below the dynamic range of the coarse digital to analog converter (DAC).

The apparatus may include a digital adder that adds the correction term to the transmit signal. The apparatus may also include a local oscillator (LO) signal generator that generates a local oscillator (LO) signal. The apparatus may also include an upconverter. The spur may be introduced to the transmit signal by the upconverter. The apparatus may also include a driver amplifier. The spur may be introduced to the transmit signal by the driver amplifier.

The correction term may include a desired correction term amplitude and a desired correction term frequency. The desired correction term frequency may be based on a frequency of the spur. The desired correction term amplitude may be based on an amplitude of the spur, on a desired output to spur amplitude difference that corresponds to out-of-band emissions specifications, or on a desired output to spur amplitude difference that corresponds to long term evolution (LTE) standards for wireless communication. A phase of the correction term may be offset from a phase of the spur such that the correction term reduces an amplitude of the spur.

The amplitude of the correction term may be approximately the same as an amplitude of the transmit signal. A frequency of the spur in the transmit signal may be greater than a frequency of the transmit signal. The correction term generator may generate multiple correction terms over a range of frequencies to reduce multiple spurs over the range of frequencies.

A method for reducing a spur is also described. The method includes generating a correction term. The method also includes adding the correction term to the transmit signal in the digital domain. The method also includes converting the transmit signal from the digital domain to the analog domain using a coarse digital to analog converter (DAC). The method also includes filtering the transmit signal using a baseband filter. The baseband filter reduces the amplitude of the correction term. The method also includes reducing a spur in the transmit signal using the reduced correction term.

A computer-program product for reducing a spur is also described. The computer-program product includes a non-transitory computer-readable medium having instructions thereon. The instructions include code for causing a wireless device to generate a correction term. The instructions also include code for causing the wireless device to add the correction term to a transmit signal in the digital domain. The instructions also include code for causing the wireless device to convert the transmit signal from the digital domain to the analog domain using a coarse digital to analog converter (DAC). The instructions also include code for causing the wireless device to filter the transmit signal using a baseband filter. The baseband filter reduces the amplitude of the correction term. The instructions also include code for causing the wireless device to reduce a spur in the transmit signal using the reduced correction term.

An apparatus for reducing a spur is also described. The apparatus includes means for generating a correction term. The apparatus also includes means for adding the correction term to a transmit signal in the digital domain. The apparatus also includes means for converting the transmit signal from the digital domain to the analog domain using a coarse digital to analog converter (DAC). The apparatus also includes means for filtering the transmit signal using a baseband filter. The baseband filter reduces the amplitude of the correction term. The apparatus also includes means for reducing a spur in the transmit signal using the reduced correction term.

BRIEF DESCRIPTION OF THE DRAWINGS

FIG. 9 illustrates certain components that may be included within a wireless device.

DETAILED DESCRIPTION

Figure 1:
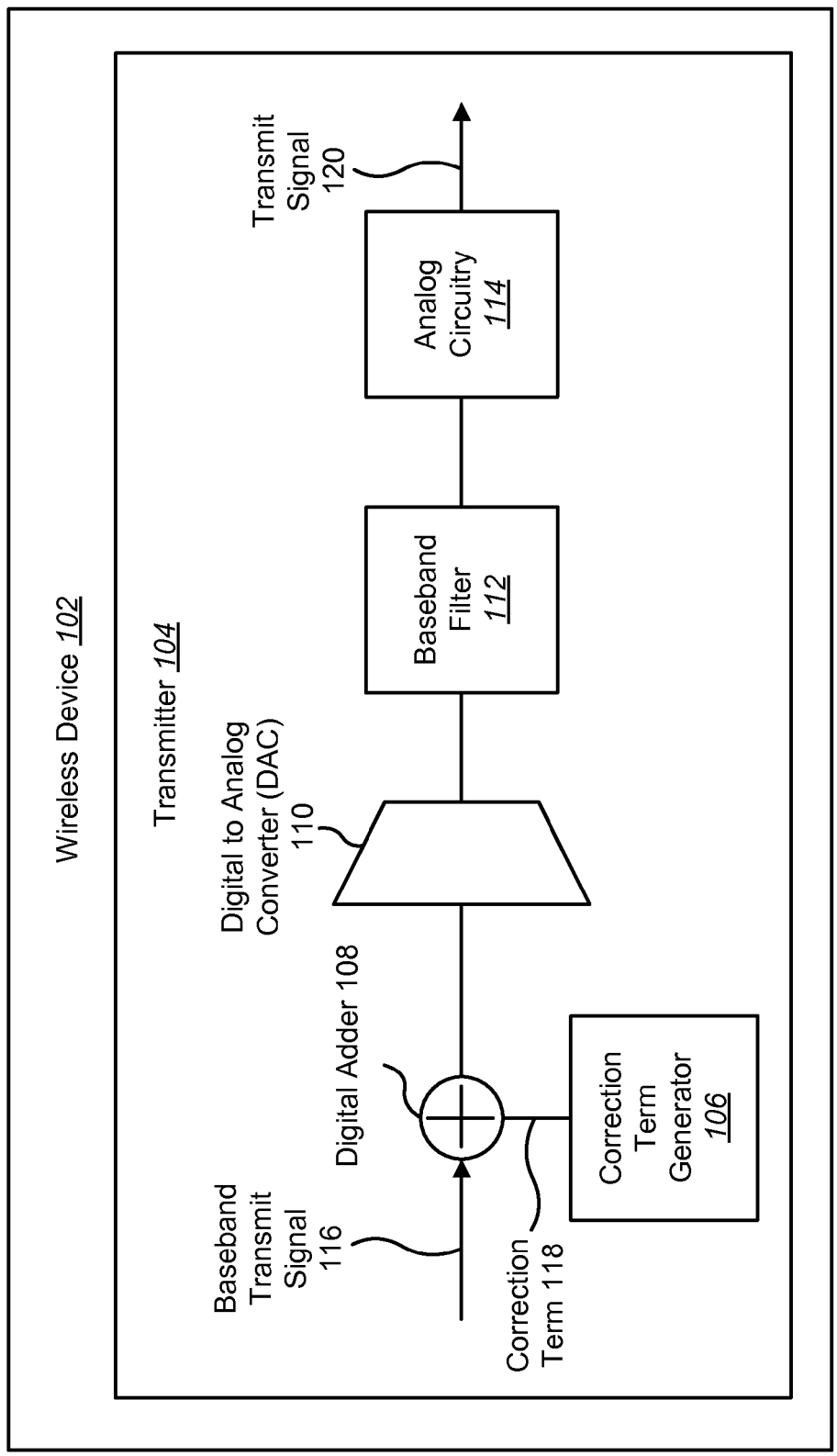
FIG. 1 is a block diagram illustrating a wireless device with a transmitter for use in the present systems and methods.

FIG. 1 shows a wireless device 102 for use in the present systems and methods. The wireless device 102 may be a wireless communication device or a base station. The wireless device 102 may include a transmitter 104. The transmitter 104 may be used for reducing spurs in a baseband transmit signal 116. More specifically, the transmitter 104 may reduce spurs by generating a correction term 118 and adding the correction term 118 to the baseband transmit signal 116 in the digital domain. The transmitter 104 may also be implemented in a wired device, and is not limited to wireless systems or transmission via antennas.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

A wireless communication device may operate in a wireless communication system that includes other wireless devices 102, such as base stations. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3rd Generation Partnership Project (3GPP) Long Term Evolution (LTE) systems and spatial division multiple access (SDMA) systems.

The wireless device 102 may include a transmitter 104. The baseband transmit signal 116 may include a desired transmit signal at the baseband frequency. The transmitter 104 may process the baseband transmit signal 116 to obtain a transmit signal 120, reducing one or more spurs that may be introduced to the transmit signal 120 prior to transmission. The transmitter 104 may include a correction term generator 106, a digital adder 108, a digital to analog converter (DAC) 110 and a baseband filter 112. The transmitter 104 may also include additional analog circuitry 114. While the baseband transmit signal 116 is being processed by the transmitter 104, one or more spurs may be introduced (e.g., by the analog circuitry 114), degrading the quality of the transmit signal 120 transmitted by the wireless device 102.

A spur may include one or more signals generated within the wireless device 102 that fall outside the band on which the transmitter 104 is meant to be operating. A spur within a transmit signal chain of the wireless device 102 may interfere with the transmit signal 120. A spur may also be referred to as a spurious tone, interfering tone, long term evolution (LTE) 4fmod term, spurious emission or output emission. A spur may be a single tone at one specific frequency. A spur may also include multiple tones within a range of frequencies. A transmit signal 120 in a wireless device 102 may include one or more spurs.

A spur may be introduced into the transmit signal 120 by circuitry within the wireless device 102. A variety of components within the wireless device 102 may introduce one or more spurs. For example, a phase locked loop (PLL), voltage controlled oscillator (VCO), local oscillator (LO), amplifier (e.g., driver amplifier) or other analog circuitry 114 may introduce one or more spurs to the transmit signal 120. In some configurations, one or more spurs may be introduced prior to the processing by the transmitter 104, such as from front end circuitry or at a receiver of the wireless device 102.

A correction term generator 106 may be used by the wireless device 102 to cancel or reduce one or more spurs. The correction term generator 106 may be implemented within the transmitter 104. The correction term generator 106 may generate one or more correction terms 118 for reducing one or more spurs. Correction terms 118 may be used to cancel or reduce spurs with frequencies and amplitudes that correspond to the correction term 118. For example, a correction term 118 may be a signal at the same frequency as a spur but with a different phase. The correction term 118 may be introduced into the baseband transmit signal 116 in the digital domain.

By adjusting the phase and amplitude of the correction term 118, the correction term 118 and the spur may cancel or reduce each other.

The correction term generator 106 may generate a correction term 118 having a specific frequency and amplitude. In determining the frequency and amplitude of the correction term 118, a variety of factors may be taken into account. For example, the frequency of the correction term 118 may be based on the frequency of an identified spur. Factors that may be considered in determining the amplitude of the correction term 118 may include the amplitude of a spur, the frequency of a spur, the filter path of a baseband filter 112, specifications of the transmitter 104, specifications of the wireless device 102, the dynamic range of the digital to analog converter (DAC) 110, a desired ratio between a transmit signal 120 and a reduced spur and out-of-band emission specifications. In some configurations, the amplitude of the correction term 118 may be determined based on reducing a spur to a desired amplitude according to long term evolution (LTE) standards for wireless communications. Furthermore, other factors related to aligning the amplitude and frequency of a correction term 118 to a spur may also be used when determining a frequency and amplitude of the correction term 118.

The correction term generator 106 may provide the correction term 118 to a digital adder 108. The digital adder 108 may combine the baseband transmit signal 116 with the correction term 118. The output of the digital adder 108 may be provided to the digital to analog converter (DAC) 110. Thus, the baseband transmit signal 116, including the correction term 118, may be converted from a digital signal to an analog signal via the digital to analog converter (DAC) 110. In some configurations, the digital to analog converter (DAC) 110 may be a coarse digital to analog converter (DAC) 110 having a narrow dynamic range of digital values. Coarse digital to analog converters (DACs) 110 may be used to reduce the cost of the wireless device 102.

A digital to analog converter (DAC) 110 may be a coarse digital to analog converter (DAC) 110 if the digital to analog converter (DAC) 110 has a limited dynamic range of operation, such that the digital to analog converter (DAC) 110 can only pass digital signals within a limited range of amplitude. For example, a digital to analog converter (DAC) 110 may be a coarse digital to analog converter (DAC) 110 if the baseband transmit signal 116 falls within the dynamic range of the digital to analog converter (DAC) 110, but one or more spurs do not fall within the dynamic range of the digital to analog converter (DAC) 110.

When using a coarse digital to analog converter (DAC) 110, the correction term generator 106 may compensate for the limited dynamic range of the digital to analog converter (DAC) 110 by generating a correction term 118 large enough to fall within the dynamic range of the digital to analog converter (DAC) 110. In some cases, the correction term 118 may be approximately the same amplitude, or slightly smaller, than the amplitude of the transmit signal 120.

The output of the digital to analog converter (DAC) 110 may be coupled to a baseband filter 112. The baseband filter 112 may include circuitry for filtering or reducing one or more signals above the frequency of the desired transmit signal. As discussed above, the correction term 118 may be added to the baseband transmit signal 116 at a higher frequency. Thus, the baseband filter 112 may filter or reduce the correction term 118. The amplitude reduction of the baseband filter 112 at different frequencies may be known (due to the design of the baseband filter 112). Thus, the reduction of the correction term 118 by the baseband filter 112 may be predictable. By selecting the amplitude of the correction term 118, the baseband filter 112 may be used to reduce the correction term 118 to an amplitude near the amplitude of a spur. Using the filter path of the baseband filter 112, the correction term 118 may be reduced to have an amplitude similar to that of a spur. In other words, the amplitude and frequency of the correction term 118 may be determined using the frequency of the spur, the amplitude of the spur and the configurations of the baseband filter 112.

The output of the baseband filter 112 may be coupled to analog circuitry 114. The analog circuitry 114 may provide additional processing signals in preparation for transmission from the wireless device 102. Examples of analog circuitry 114 may include upconverters, mixers, filters, amplifiers (e.g., driver amplifiers), voltage controlled oscillators (VCOs), phase locked loops (PLLs) and other circuitry. The analog circuitry 114 may adjust the carrier frequency of a transmit signal 120 to allow for transmission. The analog circuitry 114 may further filter or amplify the transmit signal 120 to improve the quality of the transmit signal 120. The analog circuitry 114 may also include other components for eliminating interference and preparing the transmit signal 120 for transmission from the wireless device 102. In addition to improving the quality of a transmit signal 120 and preparing the transmit signal 120 for transmission, the analog circuitry 114 may also introduce one or more spurs to the transmit signal 120. One or more correction terms 118 may be introduced by the correction term generator 106 to reduce and/or eliminate spurs introduced to the transmit signal 120 via the analog circuitry 114.

Figure 2:
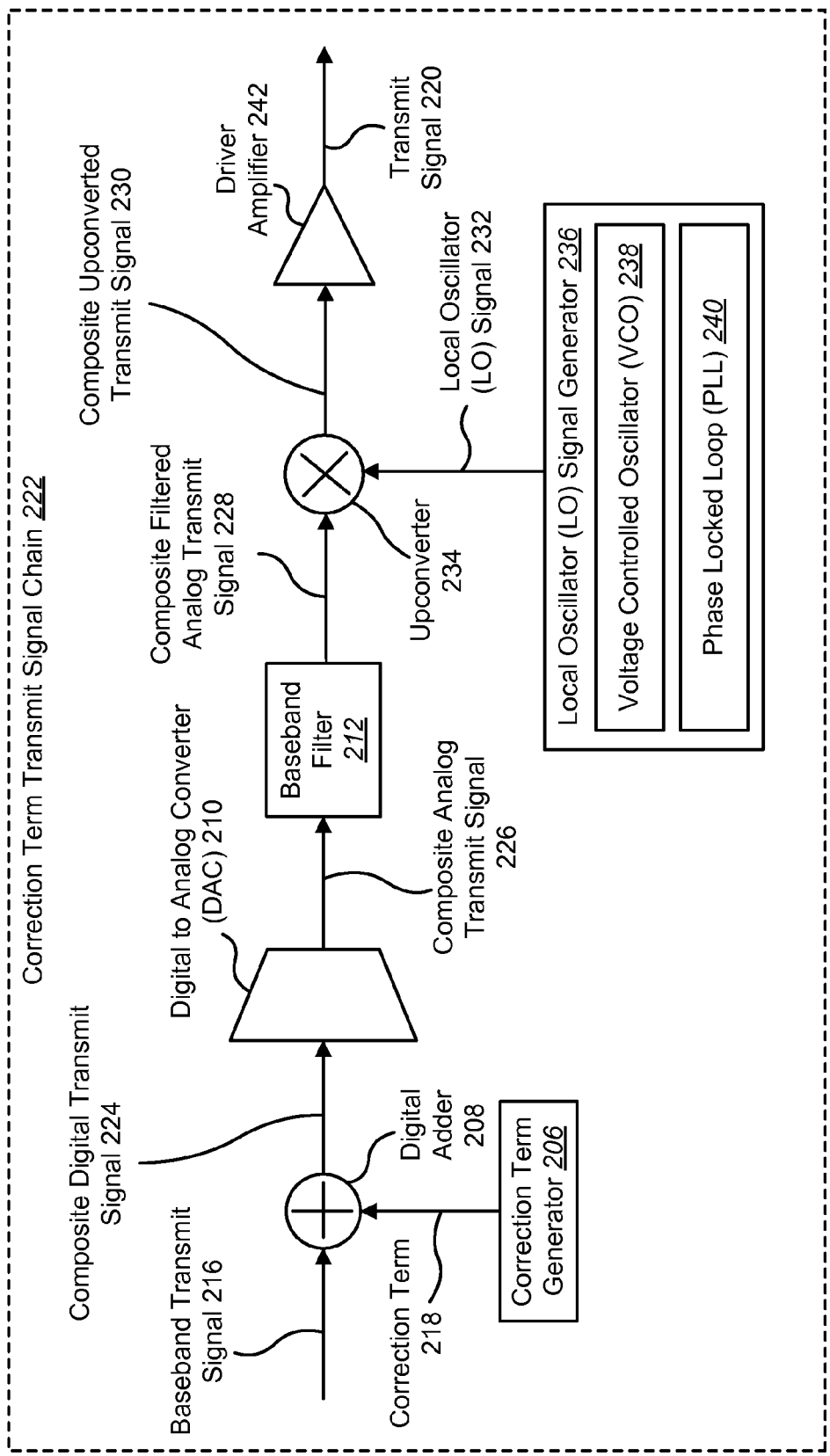
FIG. 2 is a block diagram illustrating a correction term transmit signal chain for reducing a spur in a transmitter.

FIG. 2 is a block diagram illustrating a correction term transmit signal chain 222 that reduces a spur in a transmitter 104. The correction term transmit signal chain 222 may be located on a wireless device 102. Specifically, the correction term transmit signal chain 222 may be implemented on a transmitter 104 within a wireless device 102. The correction term transmit signal chain 222 may receive a baseband transmit signal 216. The baseband transmit signal 116 may include a desired transmit signal at a specific frequency. The frequency of the desired transmit signal may be close to the baseband frequency. The correction term transmit signal chain 222 may output a transmit signal 220. The transmit signal 220 may include one or more spurs. As discussed above, the spurs may be introduced to the transmit signal 220 by the correction term transmit signal chain 222.

The correction term transmit signal chain 222 may include a correction term generator 206. The correction term generator 206 may generate one or more correction terms 218. Each correction term 218 may be located at a higher frequency than the desired transmit signal. The frequency of a correction term 218 may correspond to the frequency of a known spur. The correction term 218 may be digitally added to the baseband transmit signal 216 using a digital adder 208. The baseband transmit signal 216 and the correction term 218 may be combined to produce a composite digital transmit signal 224. The composite digital transmit signal 224 may include both the desired transmit signal of the baseband transmit signal 216 and the correction term 218 provided by the correction term generator 206.

The frequency of one or more spurs within the correction term transmit signal chain 222 may be known by the wireless device 102. For example, the wireless device 102 may know the frequencies of local oscillators (LOs) used in the correction term transmit signal chain 222 which may cause spurs. The spurs may be multiples of the local oscillator (LO) frequency. In one configuration, a local oscillator (LO) signal generator 236 with a 20 megahertz (MHz) frequency may produce spurs that are multiples of 20 MHz. The correction term generator 206 may generate correction terms 218 that correspond to spurs of interest (e.g., those spurs that are within the range of the baseband transmit signal 216 and those spurs that violate out-of-band emission requirements). Techniques to identify spurs in a wireless device 102 are discussed in additional detail below in relation to FIG. 7.

The composite digital transmit signal 224 may be provided to a digital to analog converter (DAC) 210. As discussed above, the digital to analog converter (DAC) 210 may be a coarse digital to analog converter (DAC) 210. The digital to analog converter (DAC) 210 may convert the composite digital transmit signal 224 from the digital domain to the analog domain. The digital to analog converter (DAC) 210 may then output a composite analog transmit signal 226. The composite analog transmit signal 226 may include the desired transmit signal (of the baseband transmit signal 216) and the correction term 218 from the correction term generator 206. The composite analog transmit signal 226 may be provided to a baseband filter 212.

The baseband filter 212 may be used to filter a range of frequencies of the composite analog transmit signal 226. Specifically, the baseband filter 212 may be configured to reduce any signals having a frequency higher than the desired transmit signal. For example, a correction term 218 in the composite analog transmit signal 226 may be reduced to approximately the same amplitude as a known spur. Further, the baseband filter 212 may filter multiple correction terms 218 at various frequencies. The baseband filter 212 may output a composite filtered analog transmit signal 228. The composite filtered analog transmit signal 228 may be provided to an upconverter 234.

The correction term transmit signal chain 222 may also include a local oscillator (LO) signal generator 236. The local oscillator (LO) signal generator 236 may include a voltage controlled oscillator (VCO) 238 and a phase locked loop (PLL) 240. The voltage controlled oscillator (VCO) 238 and the phase locked loop (PLL) 240 may be used to generate a local oscillator (LO) signal 232. The local oscillator (LO) signal 232 may include a local oscillator (LO) frequency and one or more spurs that may be introduced by the voltage controlled oscillator (VCO) 238 and the phase locked loop (PLL) 240 when the local oscillator (LO) signal 232 is generated. The local oscillator (LO) signal 232 may be provided to the upconverter 234.

The upconverter 234 may receive the composite filtered analog transmit signal 228 and the local oscillator (LO) signal 232. The upconverter 234 may mix or upconvert the composite filtered analog transmit signal 228 to the frequency of the local oscillator (LO) signal 232 (i.e., the desired transmit frequency). The upconverter 234 may output a composite upconverted transmit signal 230. The composite upconverted transmit signal 230 may include the desired transmit signal, the one or more spurs and the one or more correction terms 218 in the analog domain. The composite upconverted transmit signal 230 may be provided to a driver amplifier 242.

In one configuration, a spur may be introduced via the local oscillator (LO) signal 232. When the local oscillator (LO) signal 232 is combined with the composite filtered analog transmit signal 228 to produce the upconverted transmit signal 230, the spur from the local oscillator (LO) signal 232 may be introduced to the transmit signal 220. Because the correction term 218 and the known spur share a common frequency but have a phase difference, the correction term 218 may reduce the spur in the transmit signal 220.

The driver amplifier 242 may amplify the composite upconverted transmit signal 230. The driver amplifier 242 may output the transmit signal 220 to be transmitted by the wireless device 102. The transmit signal 220 may include the desired transmit signal and a reduced spur. By reducing the spur, the resulting transmit signal 220 may comply with out-of-band emission specifications or other long term evolution (LTE) standards, providing an improved signal to transmit from the wireless device 102. The transmit signal 220 may be provided to other components on the wireless device 102 or may be transmitted by an antenna.

Figure 3:
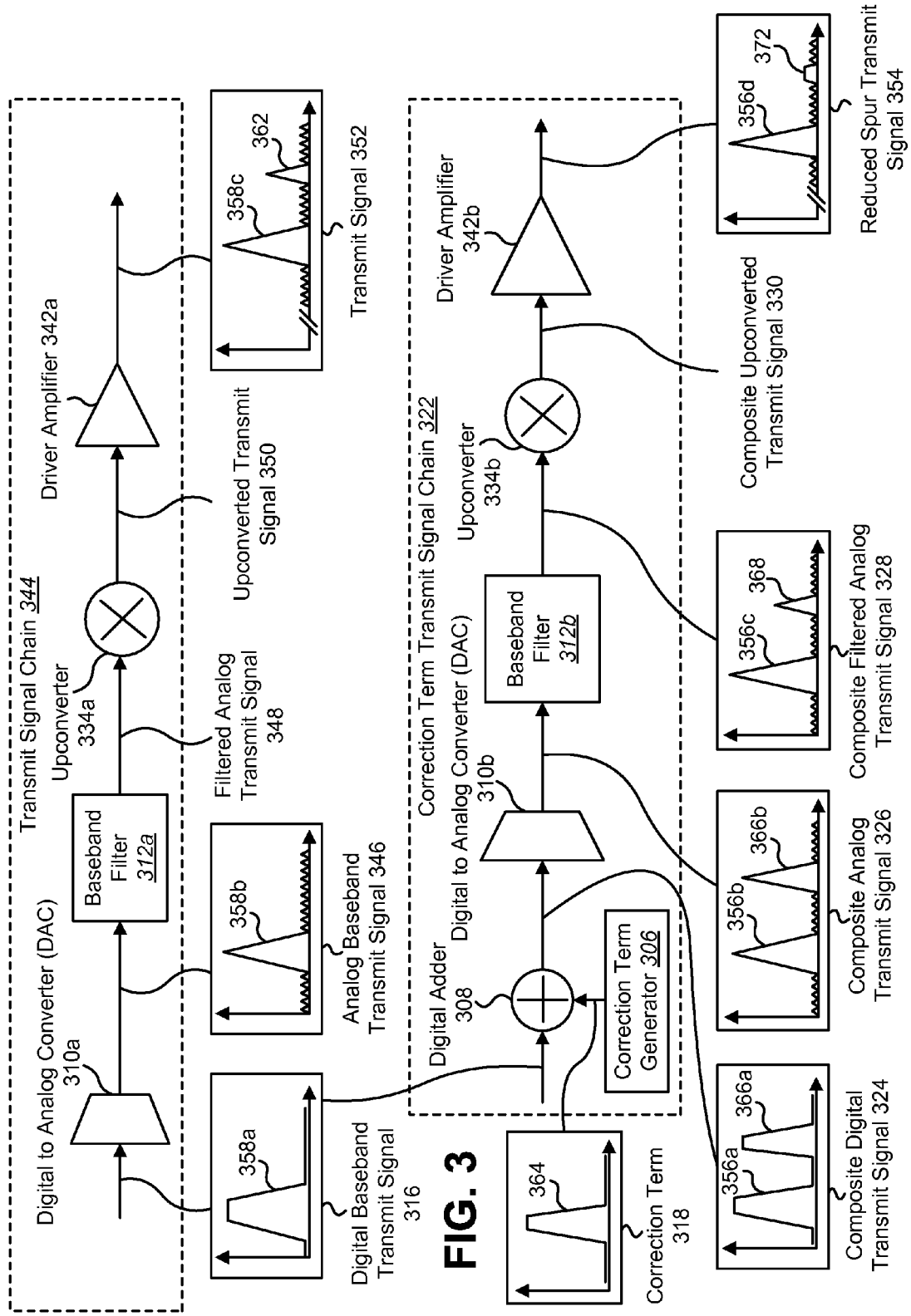
FIG. 3 is a block diagram illustrating a comparison between a transmit signal chain and a correction term transmit signal chain.

FIG. 3 is a block diagram illustrating a comparison between a transmit signal chain 344 and a correction term transmit signal chain 322. The transmit signal chain 344 shows one configuration of the processing of a digital baseband transmit signal 316 prior to transmission. The transmit signal chain 344 is accompanied by multiple graphs showing examples of signals as they are processed by the transmit signal chain 344. The transmit signal chain 344 may be implemented on a transmitter 104 within a wireless device 102. The transmit signal chain 344 may receive a digital baseband transmit signal 316. The digital baseband transmit signal 316 may include a desired transmit signal 358a at a specific frequency. The frequency of the desired transmit signal 358a may be close to the baseband frequency. Spurs 362 may be introduced to signals by the transmit signal chain 344. The transmit signal chain 344 may output a transmit signal 352 with the one or more spurs 362.

In the transmit signal chain 344, the digital baseband transmit signal 316 may be provided to a digital to analog converter (DAC) 310a. The digital to analog converter (DAC) 310a may convert the digital baseband transmit signal 316 from the digital domain to the analog domain. The digital to analog converter (DAC) 310a may output an analog baseband transmit signal 346. The analog baseband transmit signal 346 may include the desired transmit signal 358b. The analog baseband transmit signal 346 may be provided to a baseband filter 312a.

The baseband filter 312a may be used to filter a range of frequencies of the analog baseband transmit signal 346. Specifically, the baseband filter 312a may be configured to reduce any signals having a frequency higher than the desired transmit signal 358. The baseband filter 312a may output a filtered analog transmit signal 348. Higher frequency signals, such as harmonics or high frequency interference, may be filtered out or reduced from the filtered analog transmit signal 348. The filtered analog transmit signal 348 may be provided to an upconverter 334a.

The upconverter 334a may receive the filtered analog transmit signal 348 and a local oscillator (LO) signal 232. The upconverter 334a may mix or upconvert the filtered analog transmit signal 348 to the frequency of the local oscillator (LO) signal 232. The upconverter 334a may output an upconverted transmit signal 350. The upconverted transmit signal 350 may include the desired transmit signal 358 and one or more spurs 362 in the analog domain. The spurs 362 may be introduced via one or more components of the transmit signal chain 344 (e.g., a local oscillator (LO) signal generator). The upconverted transmit signal 350 may be provided to a driver amplifier 342a.

The driver amplifier 342a may amplify the upconverted transmit signal 350. The driver amplifier 342a may output a transmit signal 352 to be transmitted by the wireless device 102. The transmit signal 352 may include the desired transmit signal 358c and one or more spurs 362. While the desired transmit signal 358c at the carrier frequency may benefit from being amplified by the driver amplifier 342a, one or more spurs 362 may also be amplified, degrading the quality of the transmit signal 352. In some configurations, one or more spurs 362 may cause the transmit signal 352 to fail out-ofband emission specifications or other long term evolution (LTE) standards. Further, having one or more spurs 362 may result in a low quality signal being transmitted by the wireless device 102.

The correction term transmit signal chain 322 may also be implemented on a transmitter 104 within a wireless device 102. The correction term transmit signal chain 322 of FIG. 3 may be one configuration of the correction term transmit signal chain 222 described above in connection with FIG. 2. The correction term transmit signal chain 322 may receive a digital baseband transmit signal 316 at a specific frequency. The frequency of the desired transmit signal 358a may be close to the baseband frequency. The correction term transmit signal chain 322 may output a reduced spur transmit signal 354 with one or more reduced spurs 372.

The correction term transmit signal chain 322 may include a correction term generator 306. The correction term generator 306 may generate one or more correction terms 318 with one or more correction term signals 364. Each correction term signal 364 may be located at a higher frequency than the desired transmit signal 358a. The frequency of a correction term 318 may correspond to the frequency of a known spur. The digital baseband transmit signal 316 and the correction term 318 may be provided to a digital adder 308. The correction term 318 may be digitally added to the digital baseband transmit signal 316 using the digital adder 308. The digital baseband transmit signal 316 and the correction term 318 may be combined to produce a composite digital transmit signal 324. The composite digital transmit signal 324 may include both the desired transmit signal 356a of the digital baseband transmit signal 316 and the correction term 366a provided by the correction term generator 306. The frequency of the correction term 366a may correspond to a known spur. The amplitude of the correction term 366a may be within the dynamic range of a digital to analog converter (DAC) 310b on the correction term transmit signal chain 322.

The composite digital transmit signal 324 may be provided to the digital to analog converter (DAC) 310b. In some configurations, the digital to analog converter (DAC) 310b may be a coarse digital to analog converter (DAC) 310b, with a limited dynamic range. The digital to analog converter (DAC) 310b may convert the composite digital transmit signal 324 from the digital domain to the analog domain. The digital to analog converter (DAC) 310b may output a composite analog transmit signal 326. The composite analog transmit signal 326 may include the desired transmit signal 356b and the correction term 366b. The composite analog transmit signal 326 may be provided to a baseband filter 312b.

The baseband filter 312b may be used to filter a range of frequencies of the composite analog transmit signal 326. Specifically, the baseband filter 312b may be configured to reduce any signals having a frequency higher than the desired transmit signal 356b. For example, a correction term 366b in the composite analog transmit signal 326 may be reduced by the baseband filter 312b to approximately the same amplitude as a known spur. Further, the baseband filter 312b may be applied to multiple correction terms 318 at various frequencies. The baseband filter 312b may output a composite filtered analog transmit signal 328. The composite filtered analog transmit signal 328 may include the desired transmit signal 356c and a reduced correction term 368. The frequency and amplitude of the reduced correction term 368 may correspond to a known spur (not shown). The composite filtered analog transmit signal 328 may be provided to an upconverter 334b.

The upconverter 334b may receive the composite filtered analog transmit signal 328 and a local oscillator (LO) signal 232. The upconverter 334b may mix or upconvert the composite filtered analog transmit signal 328 to the frequency of the local oscillator (LO) signal 232. The upconverter 334b may output a composite upconverted transmit signal 330. The composite upconverted transmit signal 330 may include the desired transmit signal 356, one or more correction terms 318 and one or more spurs in the analog domain. The spurs may be introduced via one or more components of the transmit signal chain 322 (e.g., a local oscillator (LO) signal generator 236). The frequency and amplitude of each reduced correction term 318 may correspond to the frequency and amplitude of each of the known spurs. The phase of each reduced correction term 318 may be offset from the phase of each corresponding spur. The composite upconverted transmit signal 330 may be provided to a driver amplifier 342b.

The driver amplifier 342b may amplify the composite upconverted transmit signal 330. The driver amplifier 342b may output a reduced spur transmit signal 354 to be transmitted by the wireless device 102. The reduced spur transmit signal 354 may include the desired transmit signal 356d and one or more reduced spurs 372. The reduced spurs 372 may be a result of cancellation due to the phase difference of each correction term 318 added to the digital baseband transmit signal 358a. By reducing the spur 372, the resulting reduced spur transmit signal 354 may comply with out-of-band emission specifications or other long term evolution (LTE) standards, providing an improved signal to transmit from the wireless device 102. The reduced spur transmit signal 354 may be provided to other components on the wireless device 102 or may be transmitted by an antenna.

Figure 4:
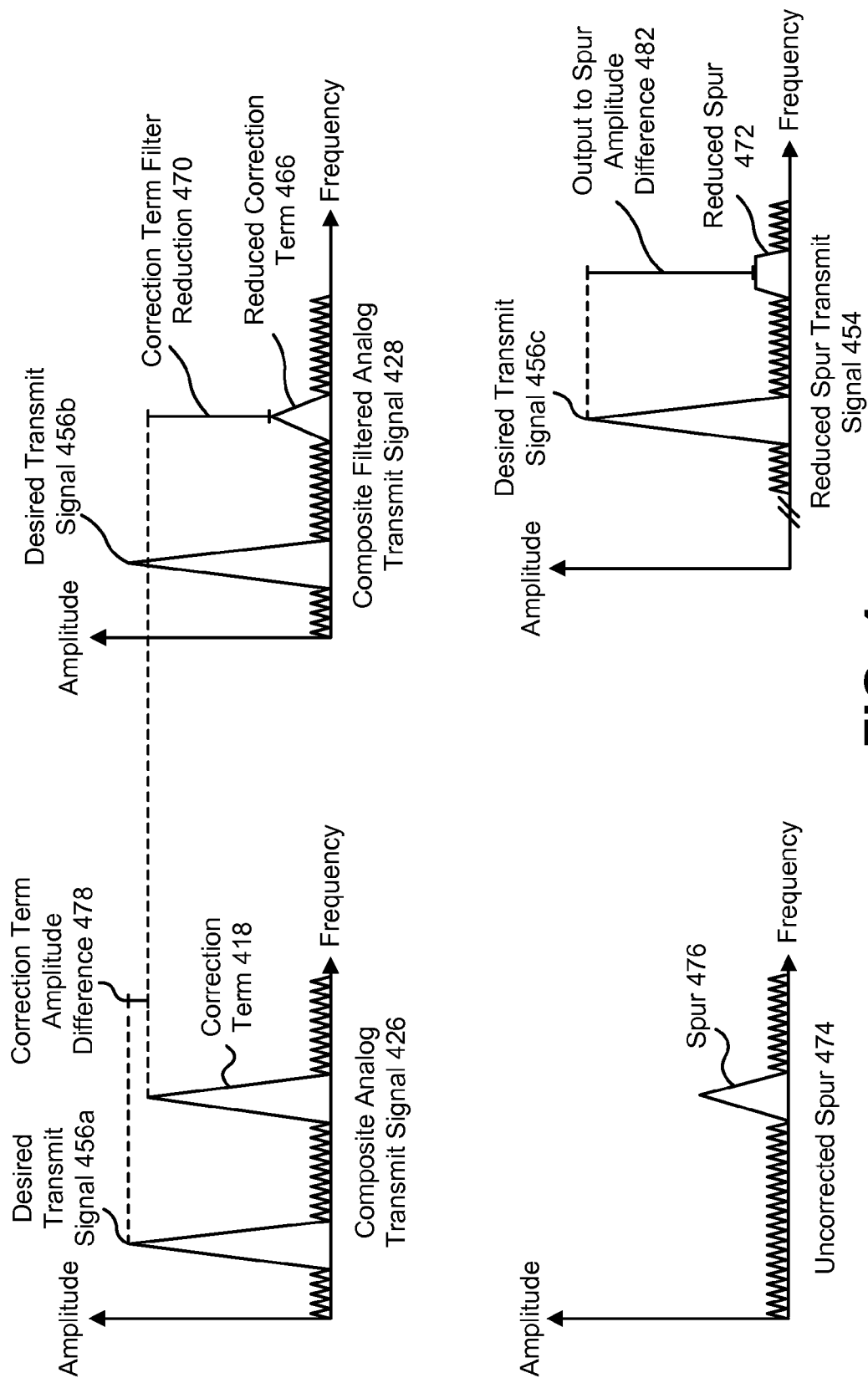
FIG. 4 illustrates graphs showing spur reduction using a correction term.

FIG. 4 illustrates graphs showing spur reduction using a correction term 418. A composite analog transmit signal 426 is shown. The composite analog transmit signal 426 may be an analog version of a composite digital transmit signal 324 provided by a digital to analog converter (DAC) 310b. The composite analog transmit signal 426 may include a desired transmit signal 456a and a correction term 418 from a correction term generator 106.

The correction term 418 may have a correction term frequency and a correction term amplitude. In determining the frequency and the amplitude of the correction term 418, a variety of factors may be taken into account. For example, the frequency of the correction term 418 may be based on the frequency of an identified spur 476. Factors that may be considered in determining the amplitude of the correction term 418 may include the amplitude of a spur 476, the frequency of a spur 476, the filter path of a baseband filter 112, specifications of a transmitter 104, specifications of a wireless device 102, the dynamic range of the digital to analog converter (DAC) 110, a desired ratio between a transmit signal 120 and a reduced spur 472 and out-of-band emission specifications. In some configurations, the amplitude of the correction term 418 may be determined based on reducing a spur 476 to a desired amplitude according to long term evolution (LTE) standards for wireless communications. Furthermore, other factors related to aligning the amplitude and frequency of a correction term 418 to a spur 476 may also be used when determining a frequency and amplitude of the correction term 418.

A correction term amplitude difference 478 is also shown. The correction term amplitude difference 478 may fall within a dynamic range of the digital to analog converter (DAC) 110. Therefore, both the amplitude of the desired transmit signal 456a and the amplitude of the correction term 418 may be within the dynamic range of the digital to analog converter (DAC) 110. In some cases, the correction term 418 may be approximately the same amplitude, or slightly smaller, than the amplitude of the desired transmit signal 456a.

A composite filtered analog transmit signal 428 is also shown. The composite filtered analog transmit signal 428 may be the output of a baseband filter 112 used for filtering the composite analog transmit signal 426. The composite filtered analog transmit signal 428 may include the desired transmit signal 456b and a reduced correction term 466. A correction term filter reduction 470 is also shown. The correction term filter reduction 470 may be due to the effects of the baseband filter 112 on the correction term 418. The frequency and amplitude of the reduced correction term 466, as well as the correction term filter reduction 470, may correspond to an identified spur 476.

An uncorrected spur 474 is also shown. The uncorrected spur 474 may include a spur 476 at a frequency corresponding to the correction term 418. In general, a spur 476 may include one or more signals produced by a transmitter 104 or wireless device 102 that fall outside the band on which the transmitter 104 is meant to be operating. A spur 476 within a transmit signal chain 344 of the wireless device 102 may interfere with the transmit signal 120. A spur 476 may also be referred to as a spurious tone, interfering tone, long term evolution (LTE) 4fmod term, spurious emission or output emission. A spur 476 may be a single tone at one specific frequency. A spur 476 may also include multiple tones within a range of frequencies. A transmit signal 120 in a wireless device 102 may include one or more spurs 476. The spur 476 may have a different phase than the correction term 418. The different phases of the spur 476 and correction term 418 may be used to reduce the spur 476.

A reduced spur transmit signal 454 is also shown. The reduced spur transmit signal 454 may include a desired transmit signal 456c (at a carrier frequency) and a reduced spur 472. The reduced spur 472 may be the result of cancellation due to the phase difference of the correction term 418 added to a baseband transmit signal 116. An output to spur amplitude difference 482 is also shown. The output to spur amplitude difference 482 may be the difference in amplitude between the desired transmit signal 456c and the reduced spur 472. By reducing the spur 476 and maximizing the output to spur amplitude difference 482, the resulting reduced spur transmit signal 454 may comply with out-of-band emission specifications or other long term evolution (LTE) standards, providing an improved signal to transmit from the wireless device 102. The reduced spur transmit signal 454 may be provided to other components on the wireless device 102 or may be transmitted by an antenna.

The correction term 418 may be designed to produce a specific output to spur amplitude difference 482. For example, a correction term 418 may be generated to produce an output to spur amplitude difference 482 of 1000:1 between the amplitude of the desired transmit signal 456c and the amplitude of the reduced spur 472.

Figure 5:
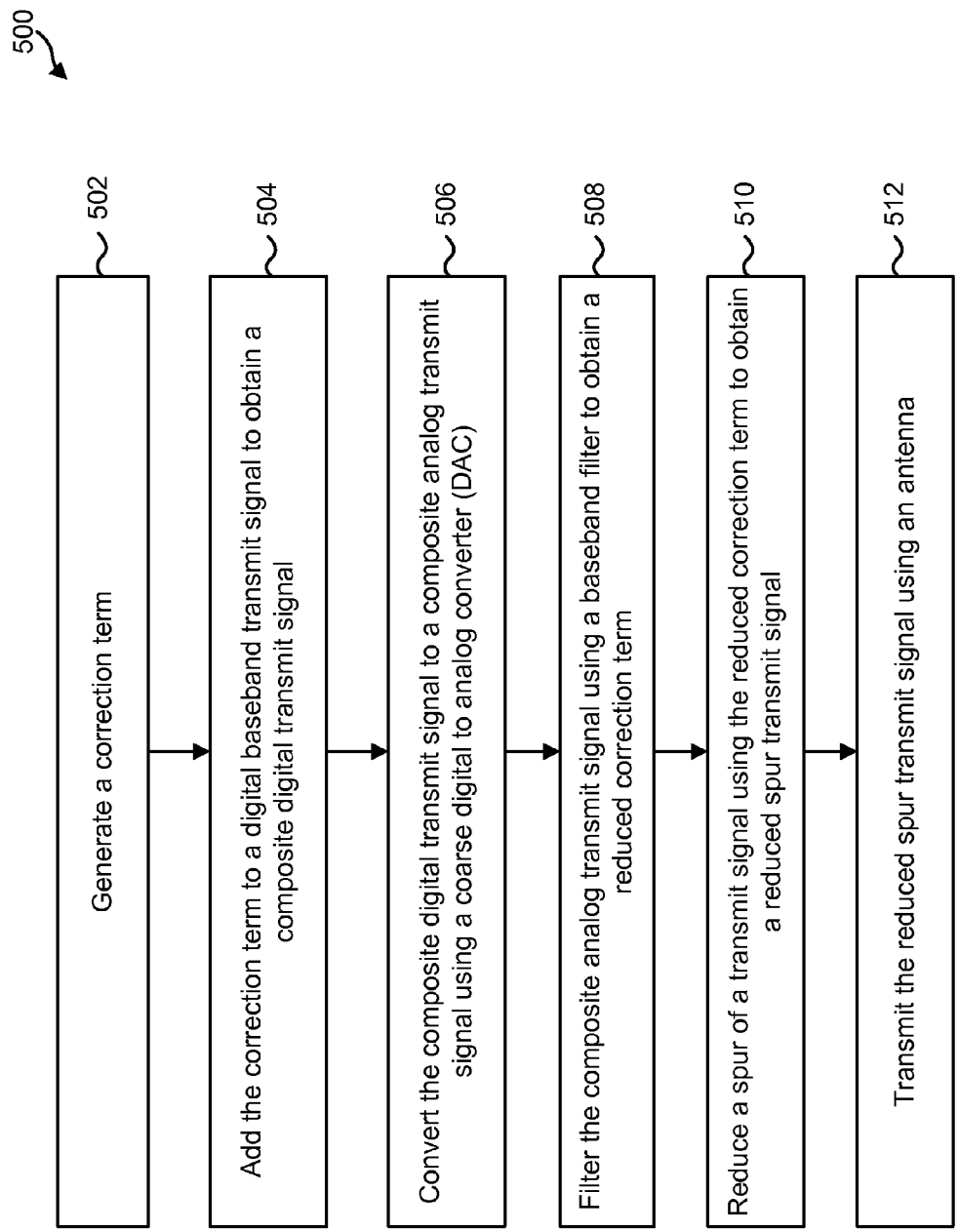
FIG. 5 is a flow diagram of a method for reducing a spur.

FIG. 5 is a flow diagram of a method 500 for reducing a spur 476. The method may be performed by a wireless device 102. The wireless device 102 may generate 502 a correction term 118. The correction term 118 may be generated by a correction term generator 106. The correction term 118 may have a specific frequency and amplitude. In determining the frequency and amplitude of the correction term 118, a variety of factors may be taken into account. For example, the frequency of the correction term 118 may be based on the frequency of an identified spur 476. Factors that may be considered in determining the amplitude of the correction term 118 may include the amplitude of a spur 476, the frequency of a spur 476, the filter properties of a baseband filter 112, specifications of the transmitter 104, specifications of the wireless device 102, the dynamic range of the digital to analog converter (DAC) 110, a desired ratio between a transmit signal 120 and a reduced spur 472 and out-of-band emission specifications. In some configurations, the amplitude of the correction term 118 may be determined based on reducing a spur 476 to a desired amplitude according to long term evolution (LTE) standards for wireless communications.

The correction term 118 may be added 504 to a baseband transmit signal 116 (e.g., a digital baseband transmit signal 316). The wireless device 102 may add the correction term 118 to the baseband transmit signal 116 using a digital adder 108 to obtain a composite digital transmit signal 224. The composite digital transmit signal 224 may be provided to a digital to analog converter (DAC) 110.

The wireless device 102 may convert 506 the composite digital transmit signal 224 from the digital domain to the analog domain using the digital to analog converter (DAC) 110. In some configurations, the digital to analog converter (DAC) 110 may be a coarse digital to analog converter (DAC) 110 having a narrow dynamic range of digital values. The digital to analog converter (DAC) 110 may output a composite analog transmit signal 226. The composite analog transmit signal 226 may be provided to a baseband filter 112.

The wireless device 102 may filter 508 the composite analog transmit signal 226 using the baseband filter 112. The baseband filter 112 may include circuitry for filtering or reducing one or more signals above the frequency of a desired transmit signal 356. As discussed above, the correction term 118 may be added to the baseband transmit signal 116 at a higher frequency. Thus, the baseband filter 112 may filter or reduce the correction term 118. The amplitude reduction of the baseband filter 112 at different frequencies may be known (due to the design of the baseband filter 112). Thus, the reduction of the correction term 118 by the baseband filter 112 may be predictable. By selecting the amplitude of the correction term 118, the baseband filter 112 may be used to reduce the correction term 118 to the specific amplitude of a spur 476.

The wireless device 102 may reduce 510 a spur 476 of a transmit signal 120 using the reduced correction term 368. The phase of the correction term 118 may be offset from the phase of the spur 476. Because the correction term 118 and the known spur 476 share a common frequency but have a phase difference, the correction term 118 may reduce the spur 476 in the transmit signal 120 to produce a reduced spur transmit signal 354. By reducing the spur 476, the resulting reduced spur transmit signal 354 may comply with out-of-band emission specifications or other long term evolution (LTE) standards, providing an improved signal to transmit from the wireless device 102. The reduced spur transmit signal 354 may be provided to other components on the wireless device 102. The wireless device 102 may also transmit 512 the reduced spur transmit signal 354 using an antenna.

Figure 6:
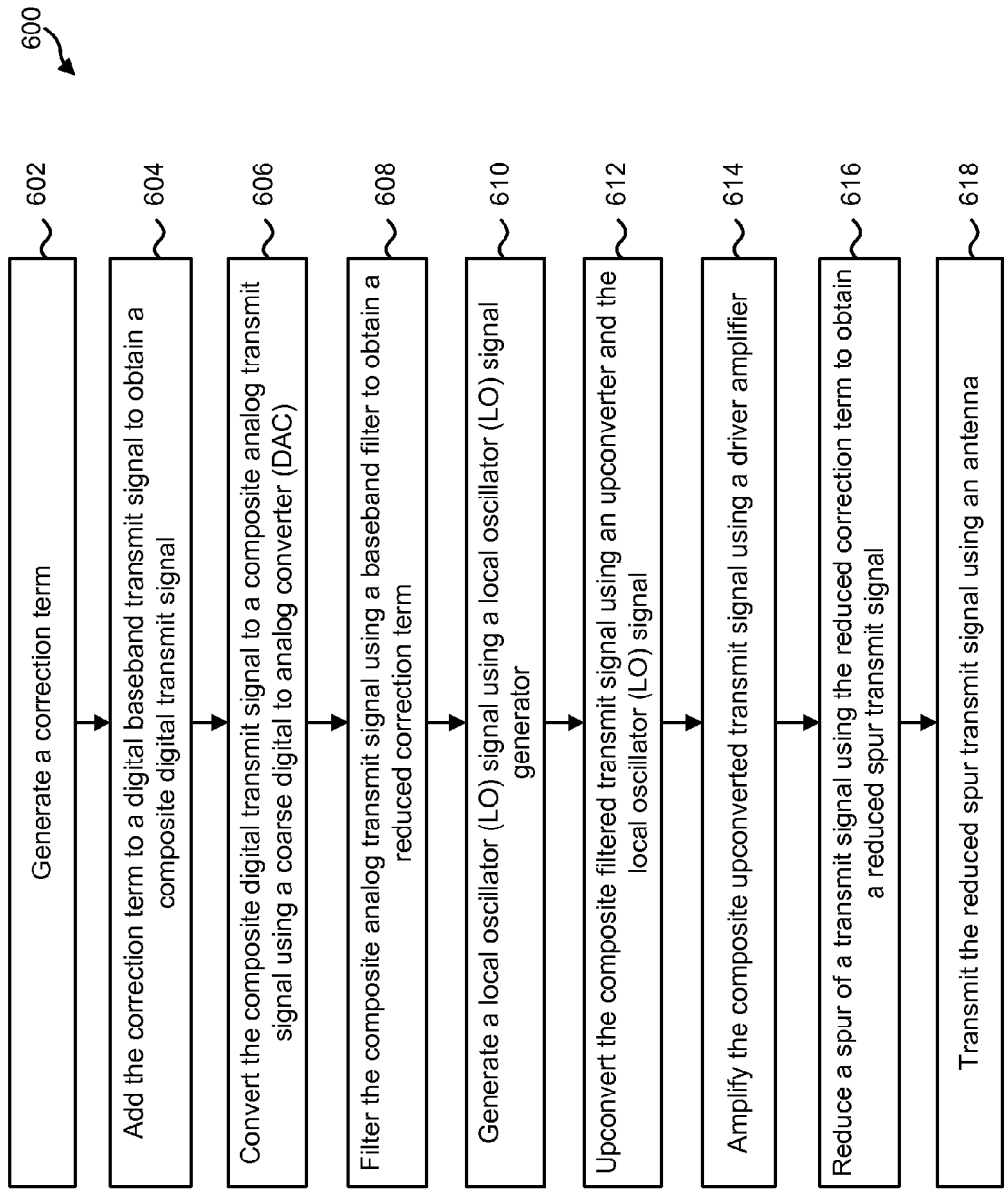
FIG. 6 is a flow diagram of a more detailed method for reducing a spur.

FIG. 6 is a flow diagram of a more detailed method 600 for reducing a spur 476. The method 600 may be performed by a wireless device 102. The wireless device 102 may generate 602 a correction term 118. The correction term 118 may be generated by a correction term generator 106. The correction term 118 may have a specific frequency and amplitude. In determining the frequency and amplitude of the correction term 118, a variety of factors may be taken into account. For example, the frequency of the correction term 118 may be based on the frequency of an identified spur 476. Factors that may be considered in determining the amplitude of the correction term 118 may include the amplitude of a spur 476, the frequency of a spur 476, the filter path of a baseband filter 112, specifications of the transmitter 104, specifications of the wireless device 102, the dynamic range of the digital to analog converter (DAC) 110, a desired ratio between a transmit signal 120 and a reduced spur 372 (i.e., the output to spur amplitude difference 482) and out-of-band emission specifications. In some configurations, the amplitude of the correction term 118 may be determined based on reducing a spur 476 to a desired amplitude according to long term evolution (LTE) standards for wireless communications.

The correction term 118 may be added 604 to a baseband transmit signal 116 (e.g., a digital baseband transmit signal 316). The wireless device 102 may add 604 the correction term 118 to the baseband transmit signal 116 using a digital adder 108 to obtain a composite digital transmit signal 224. The composite digital transmit signal 224 may be provided to a digital to analog converter (DAC) 110.

The wireless device 102 may convert 606 the composite digital transmit signal 224 from the digital domain to the analog domain using the digital to analog converter (DAC) 110. In some configurations, the digital to analog converter (DAC) 110 may be a coarse digital to analog converter (DAC) 110 having a narrow dynamic range of digital values. The digital to analog converter (DAC) 110 may output a composite analog transmit signal 226. The composite analog transmit signal 226 may be provided to a baseband filter 112.

The wireless device 102 may filter 608 the composite analog transmit signal 226 using the baseband filter 112. The baseband filter 112 may include circuitry for filtering or reducing one or more signals above the frequency of a desired transmit signal 356. As discussed above, the correction term 118 may be added to the baseband transmit signal 116 at a higher frequency. Thus, the baseband filter 112 may filter or reduce the correction term 118. The amplitude reduction of the baseband filter 112 at different frequencies may be known (due to the design of the baseband filter 112). Thus, the reduction of the correction term 118 by the baseband filter 112 may be predictable. By selecting the amplitude of the correction term 118, the baseband filter 112 may be used to reduce the correction term 118 to the specific amplitude of a spur 476. The baseband filter 112 may produce a composite filtered analog transmit signal 228. The composite filtered analog transmit signal 228 may be provided to an upconverter 234.

The wireless device 102 may generate 610 a local oscillator (LO) signal 232. The local oscillator (LO) signal 232 may be generated using a local oscillator (LO) signal generator 236. The local oscillator (LO) signal generator 236 may include a voltage controlled oscillator (VCO) 238 and a phase locked loop (PLL) 240 used to generate a local oscillator (LO) signal 232. The local oscillator (LO) signal 232 may include a local oscillator (LO) frequency and one or more spurs 476 that may be introduced by the voltage controlled oscillator (VCO) 238 and the phase locked loop (PLL) 240 when the local oscillator (LO) signal 232 is generated. The local oscillator (LO) signal 232 may be provided to the upconverter 234.

The wireless device 102 may upconvert 612 the composite filtered transmit signal 228 using the upconverter 234 and the local oscillator (LO) signal 232. Specifically, the upconverter 234 may mix or upconvert the composite filtered analog transmit signal 228 to the frequency of the local oscillator (LO) signal 232. The upconverter 234 may output a composite upconverted transmit signal 230. The composite upconverted transmit signal 230 may be provided to a driver amplifier 242.

The wireless device 102 may amplify 614 the composite upconverted transmit signal 230 using a driver amplifier 242. The driver amplifier 242 may output a transmit signal 120. The wireless device 102 may also reduce a spur 476 of the transmit signal 120 using the reduced correction term 368. The phase of the correction term 118 may be offset from the phase of the spur 476. Because the correction term 118 and the known spur 476 share a common frequency but have a phase difference, the correction term 118 may reduce 616 the spur 476 in the transmit signal 120 to obtain a reduced spur transmit signal 354. The spur 476 may be reduced using the reduced correction term 466. By reducing the spur 476, the resulting reduced spur transmit signal 354 may comply with out-of-band emission specifications or other long term evolution (LTE) standards, providing an improved signal to transmit from the wireless device 102. The reduced spur transmit signal 354 may be provided to other components on the wireless device 102. In one configuration, the wireless device 102 may transmit 618 the reduced spur transmit signal 354 using an antenna.

Figure 7:
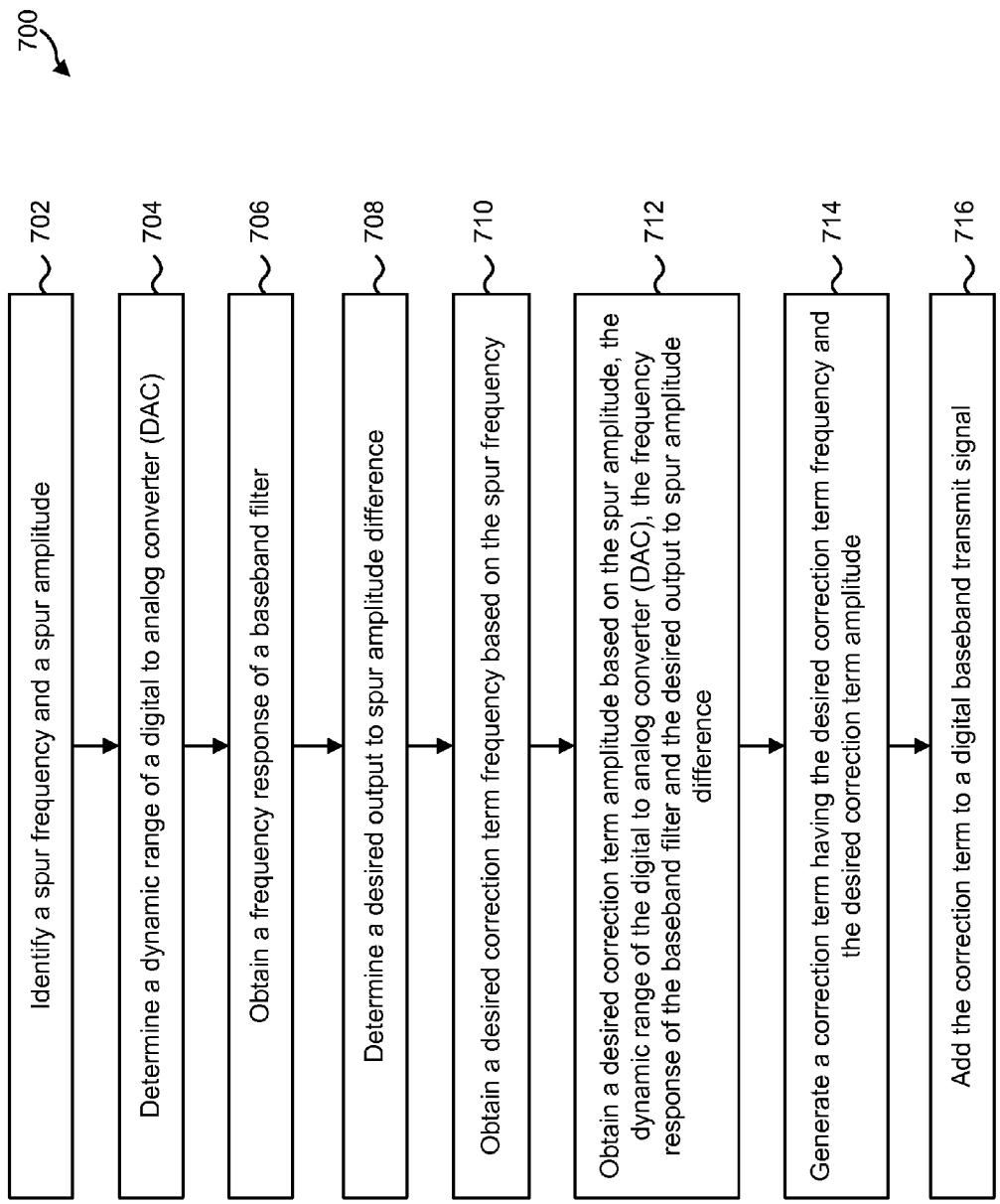
FIG. 7 is a flow diagram of a method for generating a correction term based on a spur frequency and spur amplitude.

FIG. 7 is a flow diagram of a method 700 for generating a correction term 118 based on a spur frequency and spur amplitude. The method 700 may be performed by a wireless device 102. The method 700 may be performed with respect to one or more spurs 476 generated during processing of a baseband transmit signal 116 in a wireless device 102. The wireless device 102 may identify 702 a spur frequency and a spur amplitude. The spur frequency and the spur amplitude may be known based on the design of the wireless device 102, based on testing of the wireless device 102 (e.g., by an operator or automated testing equipment) or based on circuitry within the wireless device that identifies one or more spurs 476. As an example, the wireless device 102 may know the frequencies of spurs 476 introduced by a local oscillator (LO) signal generator 236. The spurs 476 may be multiples of the local oscillator (LO) frequency. In one configuration, a local oscillator (LO) with a 20 megahertz (MHz) frequency may produce spurs 476 that are multiples of 20 MHz. Other methods may also be used in identifying 702 a spur frequency and a spur amplitude of one or more spurs 476.

The wireless device 102 may determine 704 a dynamic range of a digital to analog converter (DAC) 110. The digital to analog converter (DAC) 110 may be implemented in a transmitter 104 as part of a correction term transmit signal chain 222. In some configurations, the digital to analog converter (DAC) 110 may be a coarse digital to analog converter (DAC) 110, with a limited dynamic range.

The wireless device 102 may obtain 706 a frequency response of a baseband filter 112. The baseband filter 112 may filter or reduce one or more signals above the frequency of a desired transmit signal 356. The frequency response of the baseband filter 112 at different frequencies may be known (due to the design of the baseband filter 112). Thus, the reduction of a correction term 118 by the baseband filter 112 may be predictable.

The wireless device 102 may also determine 708 a desired output to spur amplitude difference 482. The output to spur amplitude difference 482 may be the difference in amplitude between the desired transmit signal 356 and the reduced spur 372. An output to spur amplitude difference 482 may be selected based on a variety of factors, such as out-of-band emission specifications or other long term evolution (LTE) standards. The output to spur amplitude difference 482 may be any desired ratio for amplitude reduction between a desired transmit signal 356 and a reduced spur 372. In one example, the desired output to spur amplitude difference 482 may be −70 decibels relative to the carrier (dBc). In another example, the output to spur amplitude difference 482 may be −85 dBc.

The wireless device 102 may obtain 710 a desired correction term frequency. The frequency of the correction term 118 may be based on a spur frequency. The frequency of the correction term 118 may also be based on other factors, such as the frequency response of a baseband filter 112. The wireless device 102 may also obtain 712 a desired correction term amplitude. The desired correction term amplitude may be based on a variety of factors. Examples of factors that may be considered in determining the desired correction term amplitude may include the amplitude of a spur 476, the frequency of a spur 476, the filter specifications of a baseband filter 112, specifications of the transmitter 104, specifications of the wireless device 102, the dynamic range of the digital to analog converter (DAC) 110, a desired ratio between a desired transmit signal 356 and a reduced spur 372 and out-of-band emission specifications. In some configurations, the amplitude of the correction term 118 may be determined based on reducing a spur 476 to a desired amplitude according to long term evolution (LTE) standards for wireless communications.

The wireless device 102 may generate 714 a correction term 118 having the desired correction term frequency and the desired correction term amplitude. The correction term 118 may be generated using a correction term generator 106 on a correction term transmit signal chain 222. The wireless device 102 may add 716 the correction term 118 to a baseband transmit signal 116 (e.g., a digital baseband transmit signal 316) to produce a composite digital transmit signal 224. The composite digital transmit signal 224 may be processed by a correction term transmit signal chain 222 to produce a transmit signal 120.

Figure 8:
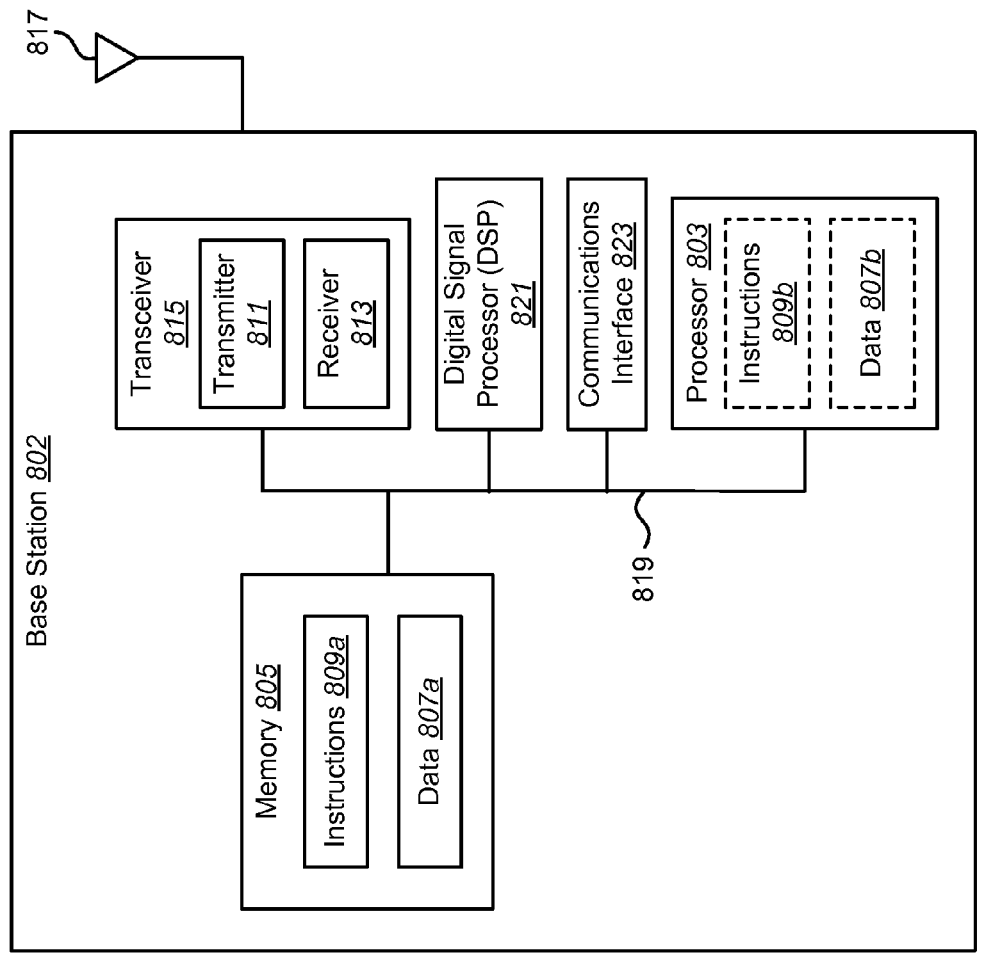
FIG. 8 illustrates certain components that may be included within a base station.

FIG. 8 illustrates certain components that may be included within a base station 802. A base station may also be referred to as, and may include some or all of the functionality of, an access point, a broadcast transmitter, a NodeB, an evolved NodeB, etc. The base station 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the base station 802 of FIG. 8, in an alternative configuration, a combination of processors (e.g., an ARM and DSP) could be used.

The base station 802 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The base station 802 may also include a transmitter 811 and a receiver 813 to allow transmission and reception of signals to and from the base station 802. The transmitter 811 and receiver 813 may be collectively referred to as a transceiver 815. An antenna 817 may be electrically coupled to the transceiver 815. The base station 802 may also include (not shown) multiple transmitters, multiple receivers, multiple transceivers and/or multiple antennas.

The base station 802 may include a digital signal processor (DSP) 821. The base station 802 may also include a communications interface 823. The communications interface 823 may allow a user to interact with the base station 802.

The various components of the base station 802 may be coupled together by one or more buses, which may include a power bus, a control signal bus, a status signal bus, a data bus, etc. For the sake of clarity, the various buses are illustrated in FIG. 8 as a bus system 819.

FIG. 9 illustrates certain components that may be included within a wireless communication device 902. The wireless communication device 902 may be an access terminal, a mobile station, a user equipment (UE), etc. The wireless communication device 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 9, in an alternative configuration, a combination of processors (e.g., an ARM and DSP) could be used.

The wireless communication device 902 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiple transmitters, multiple antennas, multiple receivers and/or multiple transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5, 6 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An apparatus for reducing spurs comprising:
   a coarse digital to analog converter;
   a correction term generator that generates a correction term, wherein the correction term has an amplitude within a dynamic range of the coarse digital to analog converter; and
   a baseband filter, wherein the correction term is selected such that the baseband filter reduces the correction term to an amplitude of a spur in a transmit signal, and wherein the correction term is used to reduce the spur.

2. The apparatus of claim 1, wherein the spur has an amplitude below the dynamic range of the coarse digital to analog converter.

3. The apparatus of claim 1, further comprising a digital adder that adds the correction term to the transmit signal.

4. The apparatus of claim 1, further comprising:
   a local oscillator signal generator that generates a local oscillator signal; and
   an upconverter, wherein the spur is introduced to the transmit signal by the upconverter.

5. The apparatus of claim 1, further comprising a driver amplifier, wherein the spur is introduced to the transmit signal by the driver amplifier.

6. The apparatus of claim 1, wherein the correction term comprises a desired correction term amplitude and a desired correction term frequency.

7. The apparatus of claim 6, wherein the desired correction term frequency is based on a frequency of the spur.

8. The apparatus of claim 6, wherein the desired correction term amplitude is based on an amplitude of the spur.

9. The apparatus of claim 6, wherein the desired correction term amplitude is based on a desired output to spur amplitude difference that corresponds to out-of-band emissions specifications.

10. The apparatus of claim 6, wherein the desired correction term amplitude is based on a desired output to spur amplitude difference that corresponds to long term evolution standards for wireless communication.

11. The apparatus of claim 6, wherein a phase of the correction term is offset from a phase of the spur, such that the correction term reduces an amplitude of the spur.

12. The apparatus of claim 1, wherein the amplitude of the correction term is an amplitude of the transmit signal.

13. The apparatus of claim 1, wherein a frequency of the spur in the transmit signal is greater than a frequency of the transmit signal.

14. The apparatus of claim 1, wherein the correction term generator generates multiple correction terms over a range of frequencies to reduce multiple spurs over the range of frequencies.

15. A method for reducing a spur, comprising:
generating a correction term using a correction term generator;
adding the correction term to a transmit signal in a digital domain;
converting the transmit signal from the digital domain to an analog domain using a coarse digital to analog converter;
filtering the transmit signal using a baseband filter, wherein the baseband filter reduces the correction term to an amplitude of the spur in the transmit signal; and
reducing the spur in the transmit signal using the reduced correction term.

16. The method of claim 15, wherein the spur has an amplitude below a dynamic range of the coarse digital to analog converter.

17. The method of claim 15, further comprising:
generating a local oscillator signal using a local oscillator signal generator; and
upconverting the transmit signal using an upconverter and the local oscillator signal, wherein the spur is introduced to the transmit signal by the upconverter.

18. The method of claim 15, further comprising amplifying the transmit signal using a driver amplifier, wherein the spur is introduced to the transmit signal by the driver amplifier.

19. The method of claim 15, wherein the correction term comprises a desired correction term amplitude and a desired correction term frequency.

20. The method of claim 19, wherein the desired correction term frequency is based on a frequency of the spur.

21. The method of claim 19, wherein the desired correction term amplitude is based on an amplitude of the spur.

22. The method of claim 19, wherein the desired correction term amplitude is based on a desired output to spur amplitude difference that corresponds to out-of-band emissions specifications.

23. The method of claim 19, wherein the desired correction term amplitude is based on a desired output to spur amplitude difference that corresponds to long term evolution standards for wireless communication.

24. The method of claim 19, wherein a phase of the correction term is offset from a phase of the spur, such that the correction term reduces an amplitude of the spur.

25. The method of claim 15, wherein an amplitude of the correction term is an amplitude of the transmit signal.

26. The method of claim 15, wherein a frequency of the spur is greater than a frequency of the transmit signal.

27. The method of claim 15, further comprising generating multiple correction terms over a frequency range for reducing multiple spurs over the frequency range.

28. The method of claim 15, wherein generating a correction term comprises identifying a spur frequency and a spur amplitude.

29. The method of claim 28, wherein generating a correction term further comprises determining a dynamic range of the coarse digital to analog converter.

30. The method of claim 29, wherein generating a correction term further comprises obtaining a frequency response of the baseband filter.

31. The method of claim 30, wherein generating a correction term further comprises determining a desired output to spur amplitude difference.

32. The method of claim 31, wherein generating a correction term further comprises obtaining a desired correction term frequency and a desired correction term amplitude.

33. The method of claim 32, wherein the desired correction term frequency is based on the spur frequency.

34. The method of claim 32, wherein the desired correction amplitude is based on the spur amplitude, the dynamic range of the coarse digital to analog converter, the frequency response of the baseband filter and the desired output to spur amplitude difference.

35. The method of claim 32, wherein generating the correction term further comprises generating the correction term that has the desired correction term frequency and the desired correction term amplitude.

36. A computer-program product for reducing a spur, the computer-program product comprising a non-transitory computer-readable medium having instructions thereon, the instructions comprising:
code for causing a wireless device to generate a correction term;
code for causing the wireless device to add the correction term to a transmit signal in a digital domain using a correction term generator;
code for causing the wireless device to convert the transmit signal from the digital domain to an analog domain using a coarse digital to analog converter;
code for causing the wireless device to filter the transmit signal using a baseband filter, wherein the baseband filter reduces the correction term to an amplitude of the spur in the transmit signal; and
code for causing the wireless device to reduce the spur in the transmit signal using the reduced correction term.

37. The computer-program product of claim 36, wherein the spur has an amplitude below a dynamic range of the coarse digital to analog converter.

38. The computer-program product of claim 36, wherein the correction term comprises a desired correction term amplitude and a desired correction term frequency.

39. The computer-program product of claim 38, wherein the desired correction term frequency is based on a frequency of the spur.

40. The computer-program product of claim 38, wherein the desired correction term amplitude is based on an amplitude of the spur.

41. The computer-program product of claim 38, wherein a phase of the correction term is offset from a phase of the spur, such that the correction term reduces an amplitude of the spur.

42. An apparatus for reducing a spur, comprising:
means for generating a correction term using a correction term generator;
means for adding the correction term to a transmit signal in a digital domain;

means for converting the transmit signal from the digital domain to an analog domain using a coarse digital to analog converter;
means for filtering the transmit signal using a baseband filter, wherein the baseband filter reduces the correction term to an amplitude of the spur in the transmit signal; and
means for reducing the spur in the transmit signal using the reduced correction term.

43. The apparatus of claim 42, wherein the spur has an amplitude below a dynamic range of the coarse digital to analog converter.

44. The apparatus of claim 42, wherein the correction term comprises a desired correction term amplitude and a desired correction term frequency.

45. The apparatus of claim 44, wherein the desired correction term frequency is based on a frequency of the spur.

46. The apparatus of claim 44, wherein the desired correction term amplitude is based on an amplitude of the spur.

47. The apparatus of claim 44, wherein a phase of the correction term is offset from a phase of the spur, such that the correction term reduces an amplitude of the spur.

\* \* \* \* \*